ARMITT McCARRAHER.
Knife for Removing Hides from Animals.
No. 123,497.           Patented Feb. 6, 1872.
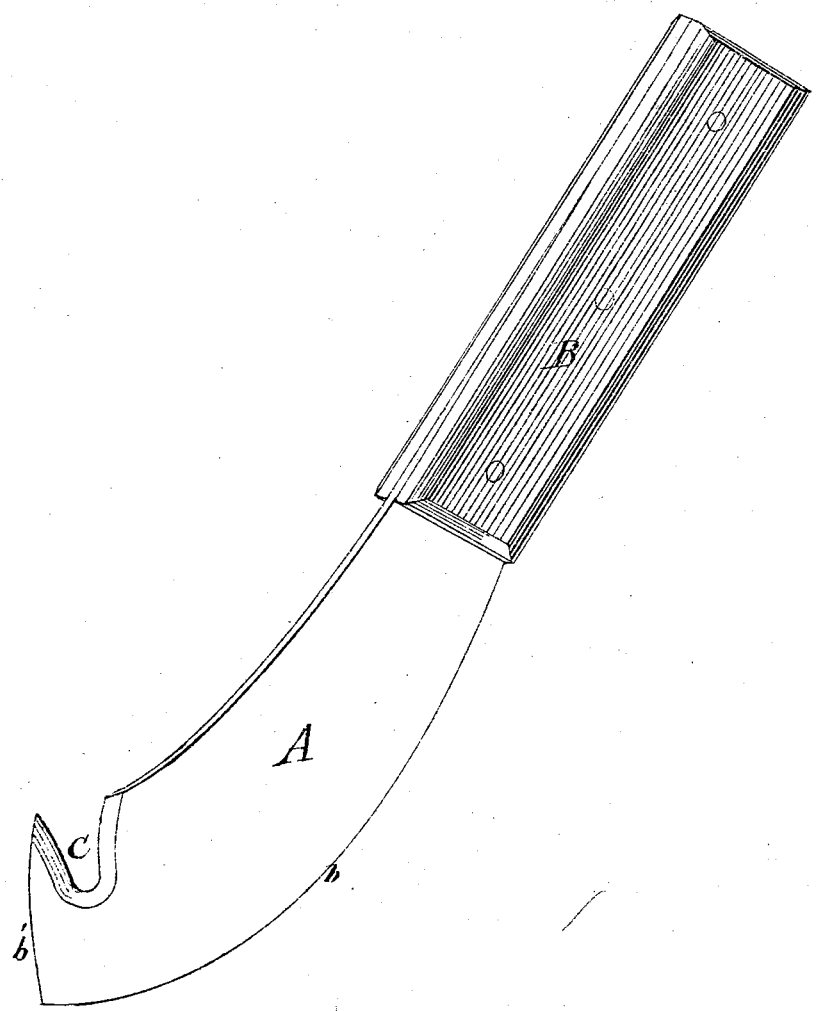

123,497

UNITED STATES PATENT OFFICE.

ARMITT McCARRAHER, OF SADISBURY TOWNSHIP, PENNSYLVANIA; (HUGH RAMBO, ADMINISTRATOR.)

IMPROVEMENT IN SKINNING-KNIVES.

Specification forming part of Letters Patent No. 123,497, dated February 6, 1872; antedated January 17, 1872.

*To all whom it may concern:*

Be it known that I, ARMITT McCARRAHER, of Sadisbury township, in the county of Chester and in the State of Pennsylvania, have invented certain new and useful Improvements in Knives for removing hides from animals; and do hereby declare that the following is a full, clear, and exact description thereof, reference being had to the accompanying drawing making a part of this specification, in which is shown a perspective view of my device.

The object of my invention is to furnish a means whereby hides may be removed from cattle with greater ease and with less liability to injury to either carcass or hide than by use of ordinary means; and it consists of a knife provided upon or within its back, and immediately within its end, with a notch having converging sharpened sides, substantially as and for the purpose hereinafter specified.

In the annexed drawing, A represents the blade, and B the handle of a butcher-knife of ordinary construction, said blade having preferably a curved form at its edge $b$, with its end $b'$ slightly curved and formed upon a line that if straight would intersect radially the center of the circle of said cutting-edge. Immediately in rear of the end $b'$, and within the back, is cut a notch, C, the sides of which converge inward and meet in a short curve at the bottom of the same, and are beveled or sharpened so as to form cutting-edges.

As thus constructed, the device is complete, and is used as follows: The point formed by the intersection of the end of the blade and the outer side of the notch is inserted beneath the hide, with said end, which is blunt, resting against the carcass of the animal, in which position said blade is maintained and drawn forward, or in such direction as to cause said point to pass between said hide and carcass, by which means the former is easily and quickly severed without mutilation or injury to either.

The especial advantages possessed by this device is that it enables an inexperienced person to perform more work and of a better quality than is possible by an expert using the ordinary means.

Having thus fully set forth the nature and merits of my invention, what I claim as new is—

A knife provided within its back, and at or immediately within its end, with a notch having converging sharpened sides, substantially as and for the purpose specified.

In testimony that I claim the foregoing I have hereunto set my hand this 28th day of June, 1871.

ARMITT McCARRAHER.

Witnesses:
AMBROSE GABLE,
HUGH RAMBO.